US010310994B2

(12) United States Patent
Stevens et al.

(10) Patent No.: US 10,310,994 B2
(45) Date of Patent: Jun. 4, 2019

(54) ASYNCHRONOUS FINITE STATE MACHINES

(71) Applicant: UNIVERSITY OF UTAH RESEARCH FOUNDATION, Salt Lake City, UT (US)

(72) Inventors: Kenneth S. Stevens, Salt Lake City, UT (US); Dipanjan Bhadra, Salt Lake City, UT (US)

(73) Assignee: UNIVERSITY OF UTAH RESEARCH FOUNDATION, Salt Lake City, UT (US)

( * ) Notice: Subject to any disclaimer, the term of this patent is extended or adjusted under 35 U.S.C. 154(b) by 298 days.

(21) Appl. No.: 15/445,699

(22) Filed: Feb. 28, 2017

(65) Prior Publication Data

US 2018/0246819 A1    Aug. 30, 2018

(51) Int. Cl.
| | | |
|---|---|---|
| *G06F 13/12* | (2006.01) | |
| *G06F 13/42* | (2006.01) | |
| *G06F 13/40* | (2006.01) | |
| *G06F 5/06* | (2006.01) | |
| *G06F 1/12* | (2006.01) | |
| *H04L 7/00* | (2006.01) | |

(52) U.S. Cl.
CPC .............. *G06F 13/124* (2013.01); *G06F 1/12* (2013.01); *G06F 5/06* (2013.01); *G06F 13/404* (2013.01); *G06F 13/405* (2013.01); *G06F 13/4282* (2013.01); *G06F 13/4286* (2013.01); *H04L 7/00* (2013.01)

(58) Field of Classification Search
CPC ........ G06F 13/124; G06F 1/12; G06F 13/405; G06F 5/06; G06F 13/4286; G06F 13/404; G06F 13/4282; H04L 7/00

USPC ............................................................. 326/46
See application file for complete search history.

(56) References Cited

U.S. PATENT DOCUMENTS

| | | | | |
|---|---|---|---|---|
| 8,362,802 B2* | 1/2013 | Nowick | ............... | H03K 19/173 326/104 |
| 2015/0326210 A1* | 11/2015 | Beerel | ..................... | H03K 3/037 326/94 |

OTHER PUBLICATIONS

Sutherland, Ivan E., "Micropipelines," Communications of the ACM, 32(6): 720-738 (1989).

(Continued)

*Primary Examiner* — Daniel D Chang
(74) *Attorney, Agent, or Firm* — Michael Best & Friedrich LLP (57) ABSTRACT

A sequential asynchronous system and a method for operating the same. The method includes operating a first asynchronous finite state machine at a first clock rate and operating a second asynchronous finite state machine at a second clock rate. The method also includes generating, with fork logic, a fork request based on a first state of the first asynchronous finite state machine and receiving, with join logic, the fork request from the fork logic. The method further includes receiving, with the join logic, a communication request from the second asynchronous finite state machine based on a second state of the second asynchronous finite state machine and initiating, with the join logic, a state transition of the second asynchronous finite state machine. The method also includes providing, with the join logic, a join acknowledgement to the fork logic upon completion of the state transition.

18 Claims, 7 Drawing Sheets

(56) References Cited

OTHER PUBLICATIONS

Bardsley et al., "Compiling the language balsa to delay insensitive hardware," in Proceedings of the IFIP TC10 WG10.5 International Conference on Hardware Description Languages and Their Applications : Specification, Modelling, Verification and Synthesis of Microelectronic Systems: Specification, Modelling, Verification and Synthesis of Microelectronic Systems, ser. CHDL'97. London, UK, UK: Chapman & Hall, Ltd., 1997, pp. 89-91.

Cortadella et al., "Desynchro-nization: Synthesis of asynchronous circuits from synchronous speci-fications," Computer-Aided Design of Integrated Circuits and Systems, IEEE Transactions on, vol. 25, No. 10, pp. 1904-1921, Oct. 2006.

Cortadella et al., "Petrify: a tool for manipulating concurrent specifications and synthesis of asynchronous controllers," IEICE Transactions on Information and Systems, vol. E80-D, No. 3, pp. 315-325, 1997.

Yun et al., "Automatic Synthesis of Extended Burst-Mode Circuits: Part I (Specification and Hazard-Free Implementation)," IEEE Transactions on Computer-Aided Design, vol. 18, No. 2, pp. 101-117, Feb. 1999.

Furber et al., "Amulet1 : a micropipelined arm," in Compcon Spring '94, Digest of Papers., Feb. 1994, pp. 476-485.

Girard, "Openmsp430 specification," Opencores, Tech. Rep., 2010.

Hollaar et al., "Direct Implementation of Asynchronous Control Units," IEEE Transactions on Computers, vol. C-31, No. 2, Feb. 1982.

Kessels et al., "The tangram framework (embedded tutorial): Asynchronous circuits for low power," in Proceedings of the 2001 Asia and South Pacific Design Automation Conference, ser. ASP-DAC '01. New York, NY, USA: ACM, 2001, pp. 255-260.

Kwak et al., "Design of Asyn-chronous MSP430 Microprocessor Using Balsa Back-end Retargeting," in 5th Southern Conference on Programmable Logic (SPL), Apr. 2009, pp. 223-228.

Lee et al., "Path Based Timing Validation for Timed Asynchronous Design," in the 29th International Conference on VLSI Design (VLSID). IEEE, Jan. 2016, pp. 511-516.

Martin et al., "The Design of an Asynchronous Microprocessor," in Advanced Research in VLSI: Proceedings of the Decennial Caltech Conference on VLSI, C. L. Seitz, Ed. MIT Press, Mar. 1989, pp. 251-273.

Martin et al., "The design of an asynchronous microprocessor," SIGARCH Comput. Archit. News, vol. 17, No. 4, pp. 99-110, Jun. 1989.

Martin et al., "The Design of an Asynchronous MIPS R3000 Microprocessor," in Proceedings of the 17th Conference on Advanced Research in VLSI, Sep. 1997, pp. 164-181.

Martin et al., "The lutonium: a sub-nanojoule asynchronous 8051 microcontroller," in Asynchronous Circuits and Systems, 2003. Proceedings. Ninth International Symposium on, May 2003, pp. 14-23.

Oh et al., "Design of Low-Power Asynchronous MSP430 Processor Core Using AFSM Based Controllers," in the 23rd International Technical Conference on Circuits/Systems, Computers and Communications (ITC-CSCC 2008), Apr. 2008, pp. 1109-1112.

Ozawa et al., "Titac2: An asynchronous 32-bit microprocessor," 1998.

Petlin et al., "Built-in self-testing of micropipelines," in in Proc. International Symposium on Advanced Re-Search in Asynchronous Circuits and Systems. IEEE Computer Society Press, 1997, pp. 22-29.

Stevens et al., "An Asynchronous Instruction Length Decoder," IEEE Journal of Solid State Circuits, vol. 36, No. 2, pp. 217-228, Feb. 2001.

Stevens et al., "Relative Timing," IEEE Transactions on Very Large Scale Integration (VLSI) Systems, vol. 1, No. 11, pp. 129-140, Feb. 2003.

Texas Instrument, "Msp430 competitive benchmarking," Texas Instrument, Tech. Rep., 2006.

Van Berkel et al., "The vlsi-programming language tangram and its translation into handshake circuits," in Proceedings of the Conference on European Design Automation, ser. EURO-DAC '91. Los Alamitos, CA, USA: IEEE computer Society Press, 1991, pp. 384-389.

Van Gageldonk et al., "An asynchronous low-power 80c51 microcontroller," in Advanced Research in Asynchronous Circuits and Systems, 1998. Proceedings. 1998 Fourth International Symposium on, Mar. 1998, pp. 96-107.

\* cited by examiner

ASYNCHRONOUS FINITE STATE MACHINES

BACKGROUND

Finite state machines may be included in digital circuit designs to execute a known and predictable sequence of events. For example, a finite state machine may be used in low-power, low-cost microprocessors where a master finite state machine and a slave finite state machine interact with each other to perform certain functions of the microprocessor. Finite state machines used in such microprocessors are clocked, rather than asynchronous.

SUMMARY

Synchronization across two clocked finite state machines can pose design challenges. For example, distributing a global clock across the different circuits of the finite state machine accounts for considerable power dissipation. In addition, addressing the design challenges of global clock distribution results in higher design costs.

In one embodiment, the invention provides a sequential asynchronous system including a first asynchronous finite state machine operating at a first clock rate and a second asynchronous finite state machine operating at a second clock rate different than the first clock rate. The sequential asynchronous system also includes a fork and join logic circuit coupled to the first asynchronous finite state machine and the second asynchronous finite state machine, and including fork logic and join logic. The fork logic is configured to generate a fork request based on a first state of the first asynchronous finite state machine. The join logic is configured to receive the fork request from the fork logic and receive a communication request from the second asynchronous finite state machine based on a second state of the second asynchronous finite state machine. The join logic is also configured to initiate a state transition of the second asynchronous finite state machine in response to receipt of the fork request and the communication request and provide a join acknowledgement to the fork logic upon completion of the state transition, wherein the fork logic sends the join acknowledgement to the first asynchronous finite state machine.

In another embodiment the invention provides a method for a sequential asynchronous system including operating a first asynchronous finite state machine at a first clock rate and operating a second asynchronous finite state machine at a second clock rate different than the first clock rate. The method also includes generating, with fork logic included in a fork and join logic circuit coupled to the first asynchronous finite state machine and the second asynchronous finite state machine, a fork request based on a first state of the first asynchronous finite state machine and receiving, with join logic included in the fork and join logic circuit, the fork request from the fork logic. The method further includes receiving, with the join logic, a communication request from the second asynchronous finite state machine based on a second state of the second asynchronous finite state machine and initiating, with the join logic, a state transition of the second asynchronous finite state machine in response to receipt of the fork request and the communication request. The method also includes providing, with the join logic, a join acknowledgement to the fork logic upon completion of the state transition, wherein the fork logic sends the join acknowledgement to the first asynchronous finite state machine.

Other aspects of the invention will become apparent by consideration of the detailed description and accompanying drawings.

DETAILED DESCRIPTION

Before any embodiments of the invention are explained in detail, it is to be understood that the embodiments are not limited in their application to the details of construction and the arrangement of components set forth in the following description or illustrated in the following drawings. The embodiments are capable of being practiced or of being carried out in various ways.

Figure 1:
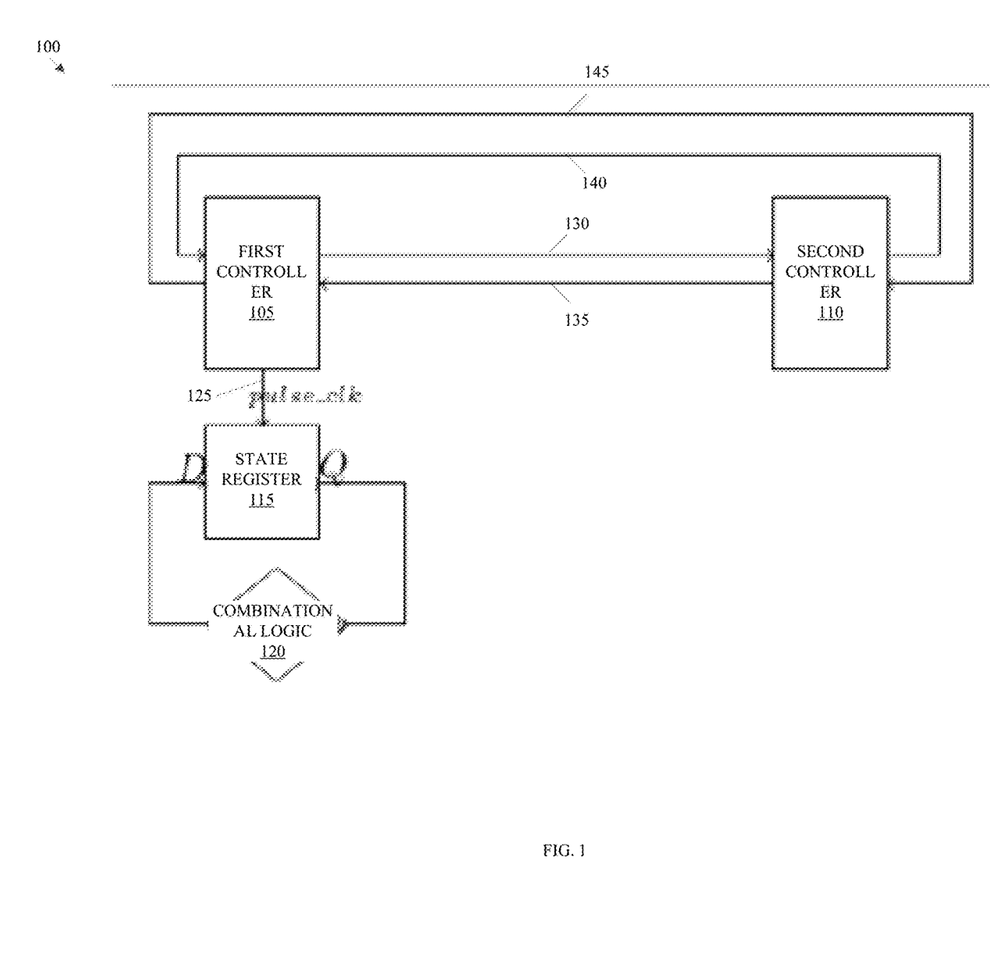
FIG. 1 illustrates an asynchronous finite state machine in accordance with some embodiments.

FIG. 1 illustrates one embodiment of an asynchronous finite state machine 100. In the example illustrated, the asynchronous finite state machine 100 includes a first controller 105, a second controller 110, a state register 115, and combinational logic 120. The first controller 105 and the second controller 110 are asynchronous handshake controllers that form the control path of the asynchronous finite state machine 100 and provide a clock signal 125 to the state register 115. The first controller 105 provides a first request 130 to the second controller 110 and receives a first acknowledgement 135 from the second controller 110. Similarly, the second controller 110 provides a second request 140 to the first controller 105 and receives a second acknowledgement 145 from the first controller 105. As shown in FIG. 1, the first controller 105 outputs the clock signal 125.

The state register 115 may be implemented as a latch, a flip-flop, or the like. The state register 115 stores the current state of the asynchronous finite state machine 100. The state register 115 provides the current state to the combinational logic 120 and receives the next state from the combinational logic 120. The state register 115 replaces the current state with the next state based on the clock signal 125 (for example, at a clock pulse) and stores the next state as the current state. The combinational logic 120 may be designed based on requirements of a system in which the asynchronous finite state machine 100 is employed. The combinational logic 120 receives the current state of the asynchronous finite state machine 100 and outputs the next state of the asynchronous finite state machine 100 to the state register 115. In addition, the asynchronous finite state machine 100 may include additional inputs and outputs. The inputs may be provided to the combinational logic 120 and the outputs and the next state may be combinational functions of the current state and the inputs. The state register 115 and the combinational logic 120 may together form a data path of the asynchronous finite state machine 100.

FIG. 1 illustrates only one example embodiment of an asynchronous finite state machine 100. The asynchronous finite state machine 100 may include more or fewer components and may perform functions other than those described herein.

Figure 2:
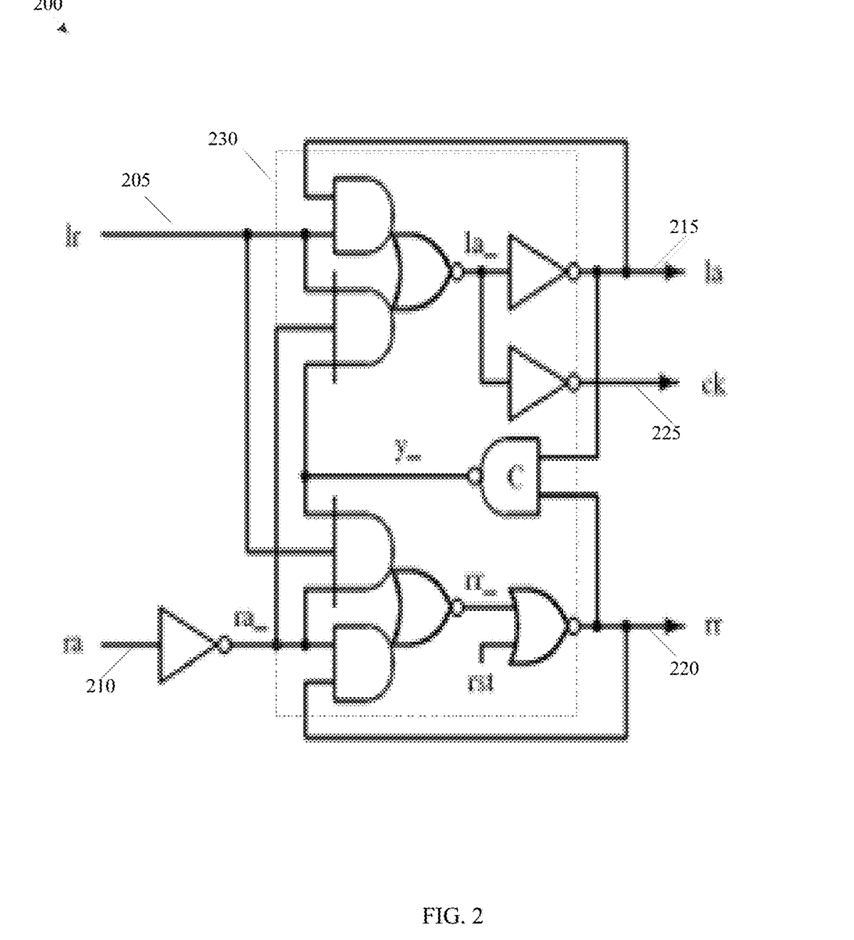
FIG. 2 illustrates an asynchronous handshake controller in accordance with some embodiments.

FIG. 2 illustrates one embodiment of an asynchronous handshake controller 200. In some embodiments, the first controller 105 and the second controller 110 are implemented as the asynchronous handshake controller 200. In the example illustrated, the controller 200 includes inputs: left request 205 and right acknowledgement 210; and outputs: left acknowledgement 215, right request 220, and clock output 225. The left request 205 and the left acknowledgement may be referred to as control signals of a first handshake channel of the controller 200. Similarly, the right acknowledgement 210 and the right request 220 may be referred to as control signals of a second handshake channel of the controller 200. The left request 205 and the left acknowledgement 215 may be connected to an upstream controller in a control path of a sequential asynchronous circuit. Similarly, the right request 220 and the right acknowledgement 210 may be connected to a downstream controller in the control path of the sequential asynchronous circuit. The controller 200 also includes combinational logic 230 that introduces a delay between the inputs and the outputs. FIG. 2 illustrates only one example of a design of the combinational logic 230. The combinational logic 230 may be designed according to the delay and design requirements of the asynchronous sequential circuit within which the controller 200 is implemented. In some embodiments, the combinational logic 230 may be modified and additional delays may be introduced by computer-aided design tools in order to meet the performance and delay targets of the sequential asynchronous circuit.

Referring back to FIG. 1, the first controller 105 and the second controller 110 may be implemented as the asynchronous handshake controller 200. In other embodiments, the first controller 105 and the second controller 110 as an asynchronous handshake controller different than the asynchronous handshake controller 200. In addition, the first controller 105 may be implemented differently than the second controller 110. In some embodiments, the combinational logic 230 may be programmable to suit the implementation of the first controller 105 and the second controller 110.

A ring is formed in the control path of the asynchronous finite state machine 100 by interconnecting the handshake channels of the first controller 105 and the second controller 110. Each handshake channel may be related to a communication token that may be in one of two states: empty or occupied. The occupied or full state may commonly be identified by indicating that the handshake channel contains a token or data. The empty state may be identified by indicating that the handshake channel contains a bubble or lack of data. In this description, when a signal is asserted, a token or data is provided with the signal. At other times, the signal provides a bubble or lack of data. Including only a single controller 200 to provide a clock signal 125 to the state register 115 may result in a deadlock when the input and output channels of the controller 200 are connected. Including two controllers (that is, the first controller 105 and the second controller 110) in the control path removes this deadlock. As such, the combinational logic 120 may calculate the next state over the cycle time of both the first controller 105 and the second controller 110.

Figure 3:
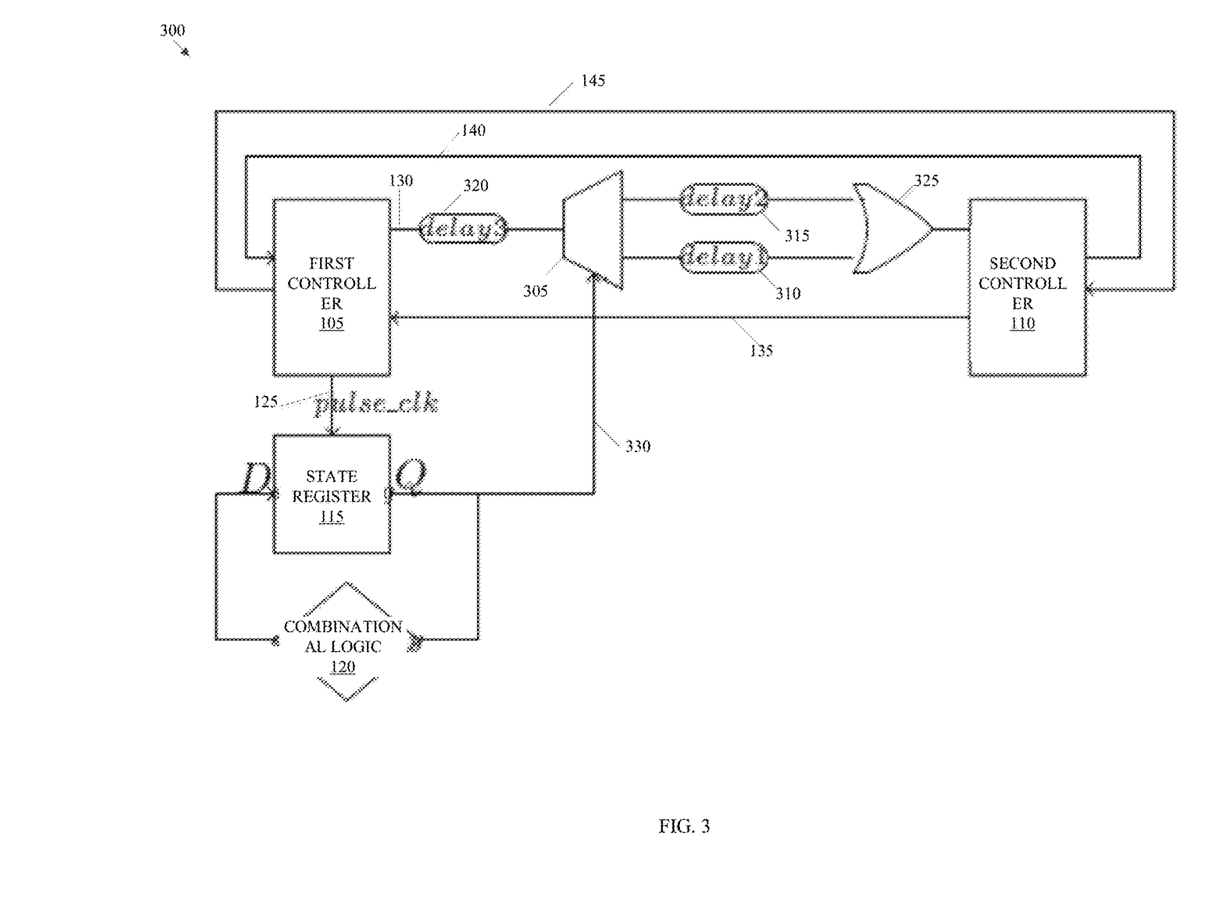
FIG. 3 illustrates an asynchronous finite state machine in accordance with some embodiments.

In some embodiments, the data path (that is, the state register 115 and the combinational logic 120) and the control path (that is, the first controller 105 and the second controller 110) of the asynchronous finite state machine 100 may interact to create multiple frequencies through the control path. In these embodiments, state variables of the asynchronous finite state machine 100 may be designed such that the state variables may be used to select various delays on the request or acknowledgement signals of the handshake channels. State variables are, for example, variables that indicate the possible states of the asynchronous finite state machine 100. FIG. 3 illustrates one embodiment of an asynchronous finite state machine 300 including additional delays in the control path. The asynchronous finite state machine 300 may be implemented similar to the asynchronous finite state machine 100 and may include similar components as the asynchronous finite state machine 100, with like components given like reference numerals. In other words, the description of the asynchronous finite state machine 100 and its components is generally applicable to the asynchronous finite state machine 300 as well, except for the differences noted herein, and is, accordingly, not repeated. In the example illustrated, the asynchronous finite state machine 300 includes a selection circuit 305, a first delay element 310, a second delay element 315, a third delay element 320, and an OR gate 325 on the first request 130. The selection circuit 305 receives the current state as the selection signal 330 from the state register 115. In some embodiments, the selection circuit 305 may receive the next state as the selection signal 330 from the combinational logic 120. The selection circuit 305 may be, for example, a select fork, a demultiplexer, or the like.

The selection signal 330 selects one of the two delay paths to propagate the first request 130. That is, based on the selection signal 330, the selection circuit 305 propagates the first request 130 either through the first delay element 310 or the second delay element 315. The OR gate 325 coalesces, via an OR logic function, the two delay paths into a single signal that is provided to the second controller 110. The third delay element 320 may optionally be added before the selection circuit 305 to ensure that the selection signal 330 is stable before the first request 130 reaches the selection circuit 305.

Figure 4:
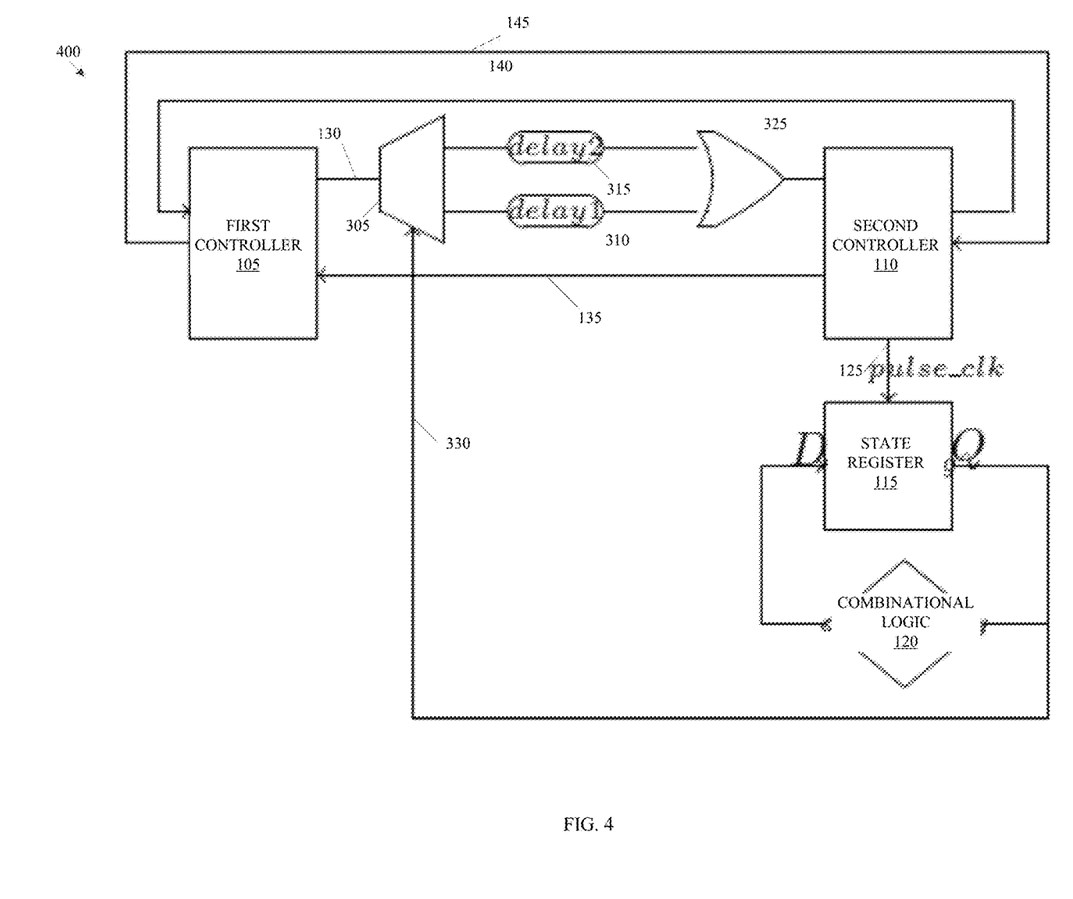
FIG. 4 illustrates an asynchronous finite state machine in accordance with some embodiments.

In some embodiment, to avoid the delay overhead due to the third delay element 320, the state register 115 may be moved upstream or alternatively the variable delay assignment may be moved downstream. FIG. 4 illustrates one embodiment of an asynchronous finite state machine 400 where the state register 115 is moved upstream. The asynchronous finite state machine 400 may be implemented similar to the asynchronous finite state machines 100, 300 and may include similar components as the asynchronous finite state machines 100, 300, with like components given like reference numerals. In other words, the description of the asynchronous finite state machine 100 and 300 and their components is generally applicable to the asynchronous finite state machine 400 as well, except for the differences noted herein, and is, accordingly, not repeated. In the example illustrated, the state register 115 receives the clock signal 125 from the second controller 110 rather than the first controller 105. One advantage of providing multiple delay paths between the first controller 105 and the second controller 110 is that the asynchronous finite state machine 400 may be used for multiple functions that involve different delay requirements. For example, the asynchronous finite state machine 400 may be used for both an addition and a multiplication operation that have different delay requirements. The current state, which may include information on whether the asynchronous finite state machine 400 is being used for an addition or multiplication operation, may provide the selection signal 330 to the selection circuit 305 to select the appropriate delay path, for example, for the addition operation or the multiplication operation.

Figure 5:
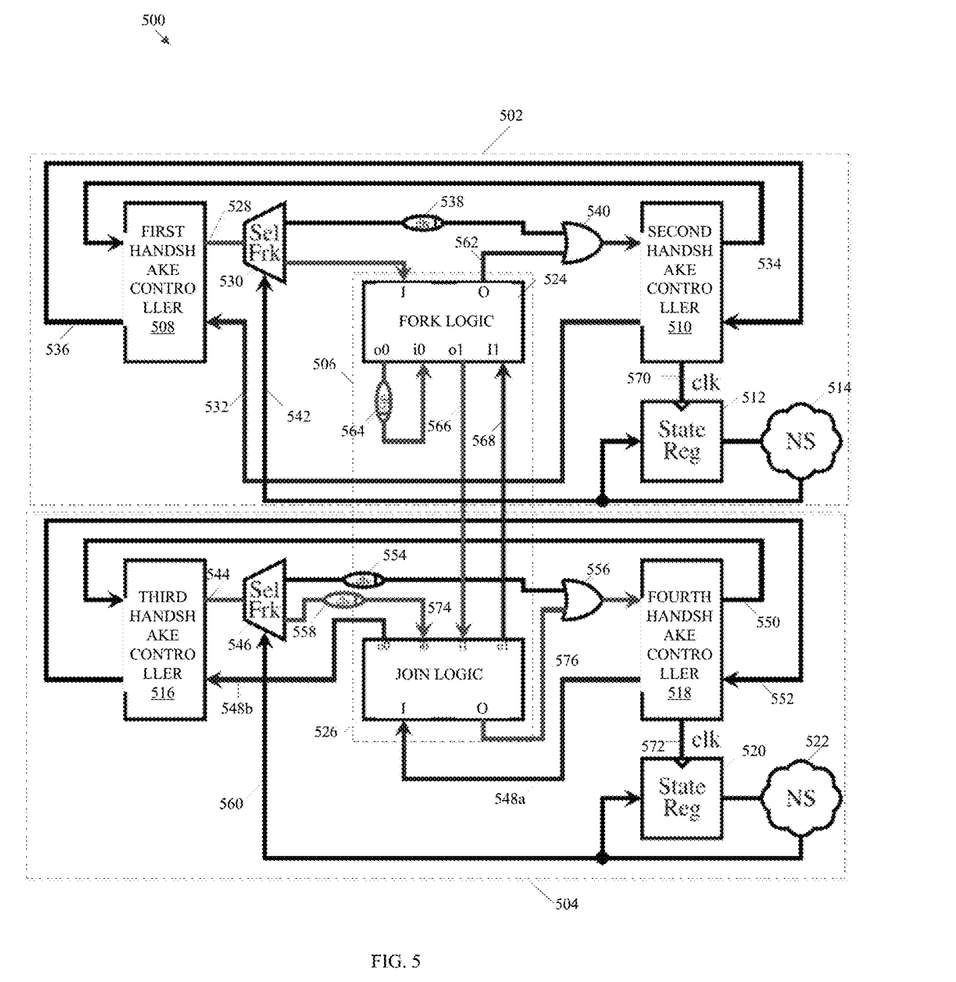
FIG. 5 illustrates a sequential asynchronous system in accordance with some embodiments.

FIG. 5 illustrates one example embodiment of a sequential asynchronous system 500. In the example illustrated, the sequential asynchronous system 500 includes a first asynchronous finite state machine 502, a second asynchronous finite state machine 504, and a fork and join logic circuit 506 coupled to the first asynchronous finite state machine 502 and the second asynchronous finite state machine 504. The first asynchronous finite state machine 502 includes a first handshake controller 508, a second handshake controller 510, a first state register 512, and a first combinational logic 514. Similarly, the second asynchronous finite state machine 504 includes a third handshake controller 516, a fourth handshake controller 518, a second state register 520, and a second combinational logic 522. The first asynchronous finite state machine 502 and the second asynchronous finite state machine 504 may function and may be implemented similar to the asynchronous finite state machines 100, 300, 400 of FIGS. 1, 3, and 4. The fork and join logic circuit 506 includes a fork logic 524 communicating with the first asynchronous finite state machine 502 and a join logic 526 communicating with the second asynchronous finite state machine 504.

The first handshake controller 508 provides a first request 528 to a first selection circuit 530 and receives a first acknowledgement 532 from the second handshake controller 510. The second handshake controller 510 provides a second request 534 to the first handshake controller 508 and receives a second acknowledgement 536 from the first handshake controller 508. The first selection circuit 530 routes the first request 528 either through a first delay element 538 to a first OR gate 540 (for example, a first delay path) or to an input I of the fork logic 524 (for example, a second delay path) based on a first selection signal 542 received from the first combinational logic 514. The first selection signal 542 is, for example, based on the next state of the first asynchronous finite state machine 502. In some embodiments, the first selection circuit 530 may receive the first selection signal 542 from the first state register 512 (that is, the current state) rather than the first combinational logic 514. The second handshake controller 510 may provide a first clock signal 570 to the first state register 512. In some embodiments, the first handshake controller 508, rather than the second handshake controller 510, provides the first clock signal 570. FIG. 3 provides an example where the first handshake controller 508, rather than the second handshake controller 510, provides the first clock signal 570.

The third handshake controller 516 provides a third request 544 to a second selection circuit 546 and receives a third acknowledgement 548b from the join logic 526. The fourth handshake controller 518 provides a fourth request 550 to the third handshake controller 516 and receives a fourth acknowledgement 552 from the third handshake controller 516. The fourth handshake controller 518 provides a third acknowledgement 548a to the join logic 526. The second selection circuit 546 selectively provides the third request 544 through a second delay element 554 to a second OR gate 556 (for example, a first delay path). The second selection circuit 546 also selectively provides the third request 544 through a third delay element 558 as a communication request 574 to an input i0 of the join logic 526 (for example, a second delay path). The second selection circuit 546 routes the third request 544 either through the second delay element 554 or as the communication request 574 based on a second selection signal 560 received from the second combinational logic 522. The second selection signal 560 is, for example, based on the next state of the second asynchronous finite state machine 504. In some embodiments, the second selection circuit 546 may receive the second selection signal 560 from the second state register 520 (that is, the current state) rather than the second combinational logic 522. The fourth handshake controller 518 may provide a second clock signal 572 to the second state register 520. In some embodiments, the third handshake controller 516, rather than the fourth handshake controller 518, provides the second clock signal 572. FIG. 3 provides an example where the third handshake controller 516, rather than the fourth handshake controller 518, provides the second clock signal 572.

The fork logic 524 receives the first request 528 through the first selection circuit 530 at input I and provides a signal 562 to the first OR gate 540 at output O. The fork logic 524 also provides an output o0 to a fourth delay element 564, which is fed back to an input i0 of the fork logic 524. The fork logic 524 provides a fork request 566 at output o1 to the join logic 526. The join logic 526 receives the third acknowledgement 548a at input I and provides a signal 576 at output O to the second OR gate 556. The join logic 526 provides the third acknowledgement 548a as the third acknowledgment 548b to the third handshake controller 516 at output o0 and receives the third request 544 through the second selection circuit 546 and the third delay element 558 at input i0 as the communication request 574. The join logic 526 receives the fork request 566 at input i1 from the fork logic 524 and provides a join acknowledgement 568 to the fork logic 524 at output o1. The fork logic 524 receives the join acknowledgement 568 at input i1.

Low-power microprocessors, such as, Texas Instruments MSP430™, use clocked finite state machines (FSM) to perform the functions of the microprocessor. These microprocessors may typically include, for example, a decode FSM to decode instructions from a memory and an execute FSM to execute the instructions decoded from the memory. In these instances, the decode FSM fetches a new instruction word and sends a request to the execute FSM to execute the instruction. The decode FSM stalls until the execute FSM is ready to use the data. When the execute FSM provides an acknowledgement to the decode FSM that the execute FSM received the data, the decode FSM moves to the next operation. As such, the decode FSM acts as the master FSM and the execute FSM acts as the slave FSM.

The sequential asynchronous system 500 may be used to replace the clocked FSMs of low-power microprocessor to provide various advantages and performance improvements. The first asynchronous finite state machine 502 may be used as the master FSM (for example, a decode FSM), while the second asynchronous finite state machine 504 may be used as the slave FSM (for example, an execute FSM).

Figure 6:
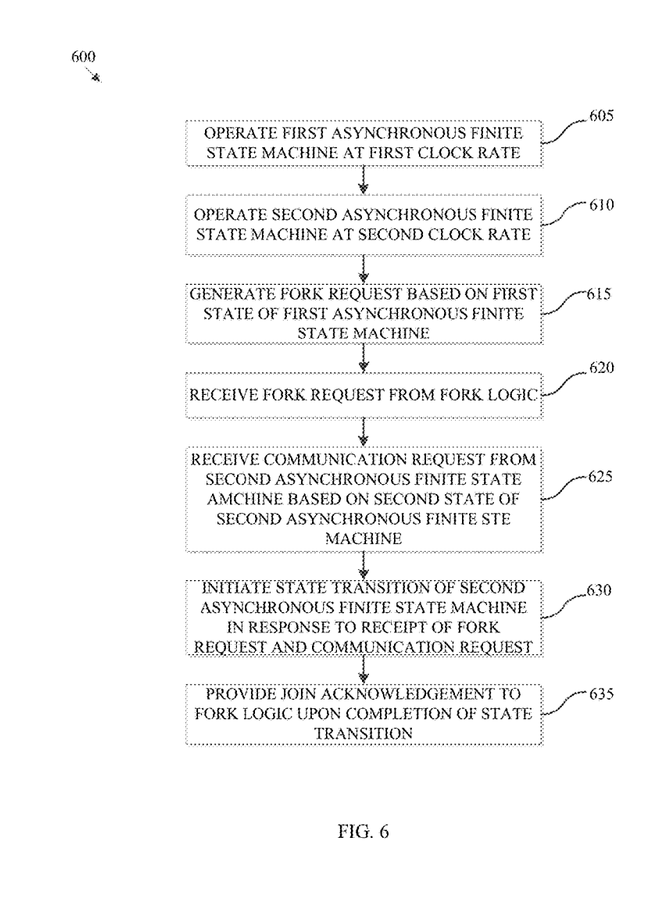
FIG. 6 illustrates a method for the sequential asynchronous system of FIG. 5 in accordance with some embodiments.

FIG. 6 is a flowchart illustrating one example method 600 for the sequential asynchronous system 500. As illustrated in FIG. 6, the method 600 includes operating the first asynchronous finite state machine 502 at a first clock rate (at step 605) and operating the second asynchronous finite state machine 504 at a second clock rate different than the first clock rate (at step 610). As discussed above, the second handshake controller 510 provides the first clock signal 570 to the first state register 512 at the first clock rate and the fourth handshake controller 518 provides the second clock signal 572 to the second state register 520 at the second clock rate. In other words, the first asynchronous finite state machine 502 may provide the first clock signal 570 at a first frequency and the second asynchronous finite state machine 504 may provide the second clock signal 572 at a second frequency that is different than the first frequency. The first frequency and the second frequency may be based on the programmed logic of the handshake controllers. In addition, the first asynchronous finite state machine 502 and the second asynchronous finite state machine 504 may operate independently of each other. Accordingly, the first clock rate and the second clock rate may not be dependent on each other.

The method 600 includes generating, with the fork logic 524 included in the fork and join logic circuit 506 coupled to the first asynchronous finite state machine 502 and the second asynchronous finite state machine 504, a fork request 566 based on a first state of the first asynchronous finite state machine 502 (at step 615). Continuing with the example of the decode FSM and the execute FSM above, the first asynchronous finite state machine 502 may fetch an instruction and determine that the instruction needs to be executed by the second asynchronous finite state machine 504. At this point, the state of the first asynchronous finite state machine 502 may change from, for example, a "fetch state" to an "execute state" or an "interrupt state" (i.e., the first state). This state information is provided to the first selection circuit 530 through the first selection signal 542. The first selection circuit 530 routes the first request 528 to the fork logic 524 when the first selection signal 542 indicates that the first asynchronous finite state machine 502 is in the "execute state" (i.e., first state). The fork logic 524 generates the fork request 566 (i.e., the fork logic asserts a token or data) at output o1 upon receiving the first request 528 at input I. As discussed above, the fork request 566 is provided to the join logic 526. At this point, the first asynchronous finite state machine 502 may be stalled until the first asynchronous finite state machine 502 receives an acknowledgement from the second asynchronous finite state machine 504 indication, for example, that the second asynchronous finite state machine 504 has received the instruction and initiated the execution. In addition, when the first asynchronous finite state machine 502 changes back to, for example, the "fetch state" (i.e., a third state), the first selection circuit 530 provides the first request 528 to the second handshake controller 510 through the first delay element 538 and the first OR gate 540. In the "fetch state," the fork request 566 may propagate a bubble or lack of data to the join logic.

The method 600 includes receiving, with the join logic 526 included in the fork and join logic circuit 506, the fork request 566 from the fork logic 524 (at step 620). As discussed above, the join logic 526 receives the fork request 566 at input i1. For example, the join logic 526 receives the fork request 566 when an instruction fetched by the first asynchronous finite state machine 502 is ready for execution. The method 600 also includes receiving, with the join logic 526, the communication request 574 from the second asynchronous finite state machine 504 based on a second state of the second asynchronous finite state machine 504 (at step 625). The join logic 526 receives the communication request 574 (i.e., when a token or data is asserted in the communication request 574) at input i0. For example, the second asynchronous finite state machine 504 may not execute an instruction until it has finished executing a previous instruction. As such, join logic 526 stalls the fork request 566 until the second asynchronous finite state machine 504 is ready to execute the new instruction. When the second asynchronous finite state machine 504 is ready to execute a new instruction, the state of the second asynchronous finite state machine 504 may change from, for example, an "execute state" to a "ready state" or "interrupt state" (i.e., second state). This state information is provided to the second selection circuit 546 through the second selection signal 560. The second selection circuit 546 routes the third request 544 as the communication request 574 to the join logic 526 when the second selection signal 560 indicates the second asynchronous finite state machine 504 is in the "ready state" (i.e., second state). In addition, when the second asynchronous finite state machine 504 changes back to, for example, the "fetch state" (i.e., a fourth state), the second selection circuit 546 provides the third request 544 to the fourth handshake controller 518 through the second delay element 554 and the second OR gate 556.

The method 600 includes initiating, with the join logic 526, a state transition of the second asynchronous finite state machine 504 in response to receipt of the fork request 566 and the communication request 574 (at step 630). When the join logic 526 receives both the fork request 566 and the communication request 574 (i.e., tokens or data at both signals), the join logic 526 provides the fork request 576 (i.e., asserts token or data) to the fourth handshake controller 518 through the second OR gate 556. Upon receiving a signal from the second OR gate 556, the fourth handshake controller 518 provides the second clock signal 572 (i.e., a clock pulse) to the second state register 520 to initiate a state transition of the second asynchronous finite state machine 504. For example, the join logic 526 initiates a state transition from the "ready state" to the "execute state" in order to instruct the second asynchronous finite state machine 504 to execute a received instruction.

The method 600 includes providing, with the join logic 526, the join acknowledgement 568 to the fork logic 524 upon completion of the state transition, wherein the fork logic 524 sends the join acknowledgement 568 to the first asynchronous finite state machine 502 (at step 635). When the state transition is initiated, for example, by asserting the second clock signal 572, the fourth handshake controller 518 asserts the third acknowledgement 548a (i.e., token or data) to the join logic 526. The join logic 526 asserts the join acknowledgement 568 (i.e., token or data) at output o1 when the join logic 526 receives the third acknowledgement 548a after receiving the fork request 566 and/or the communication request 574. The join acknowledgement 568 indicates, for example, that the second asynchronous finite state machine 504 is executing the instruction provided by the first asynchronous finite state machine 502. The fork logic 524 receives the join acknowledgement 568 at input i1 and asserts the signal 562 (i.e., a token or data) to the second handshake controller 510 through the first OR gate 540 upon receiving the join acknowledgement 568. The first asynchronous finite state machine 502 may be stalled until the join acknowledgement 568 is asserted.

Figure 7:
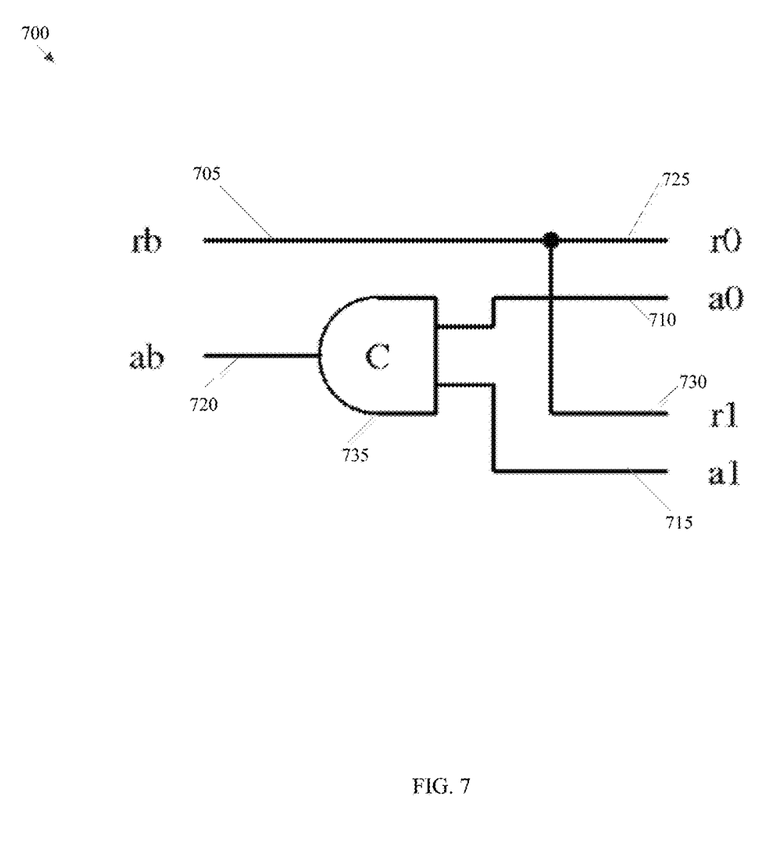
FIG. 7 illustrates a fork/join template in accordance with some embodiments.

FIG. 7 illustrates one example embodiment of a fork/join template 700. In some embodiments, the fork logic 524 and the join logic 526 may be implemented using the fork/join template 700. In the example illustrated, the fork/join template 700 includes inputs: request input 705, first acknowledgement input 710, and second acknowledgement input 715; and outputs: acknowledgement output 720, first request output 725, and second request output 730. The request input 705 is forked or split to provide the first request output 725 and the second request output 730. The first acknowledgement input 710 and the second acknowledgement input 715 are provided to a C-element 735 (for example, Muller C-gate). The C-element 735 provides the acknowledgement output 720 based on the first acknowledgement input 710 and the second acknowledgement input 715. FIG. 7 illustrates only one example embodiment of a fork/join template 700. The fork/join template 700 may be designed differently to meet the design, power, and performance targets of the sequential asynchronous system 500.

Referring to FIG. 5, the fork logic 524 may be implemented as the fork/join template 700. The input I corresponds to the request input 705, input i0 corresponds to the first acknowledgement input 710, and input i1 corresponds to the second acknowledgement input 715. The output O corresponds to the acknowledgement output 720, output o0 corresponds to the first request output 725, and output o1 corresponds to the second request output 730. During operation, when the fork logic 524 receives the first request 528 at input I (i.e., at request input 705), the fork logic 524 splits the first request 528 to provide a request output at output o0 (i.e., first request output 725) and the fork request 566 at output o1 (i.e., second request output 730). The request output at output o0 is fed back to the acknowledgement input at input i0 (i.e., first acknowledgement input 710). When the fork logic 524 receives both the acknowledgement input at input i0 and the join acknowledgement 568 at input i1 (i.e., second acknowledgement input 715), the fork logic 524 asserts the signal 562 at output O (i.e., acknowledgement output 720). In other words, the fork logic 524 removes a stall condition of the first asynchronous finite state machine 502 after receiving a join acknowledgement 568 from the second asynchronous finite state machine 504. In addition, the fork logic 524 forwards the fork request 566 to the second asynchronous finite state machine 504.

The join logic 526 may also be implemented as the fork/join template 700. However, the requests are changed to acknowledgements and the acknowledgements are changed to requests. During operation, when the join logic 526 receives the third acknowledgement 548a at input I (i.e., at request input 705), the join logic 526 splits the third acknowledgement 548a to provide the third acknowledgement 548b at output o0 (i.e., first request output 725) and the join acknowledgement 568 at output o1 (i.e., second request output 730). When the join logic 526 receives both the communication request 574 at input i0 (i.e., first acknowledgement input 710) and the fork request 566 at input i1 (i.e., second acknowledgement input 715), the join logic 526 asserts the signal 576 at output O (i.e., acknowledgement output 720). In other words, the join logic 526 initiates the state change upon receiving a communication request 574 and fork request 566. In addition, the join logic 526 forwards the acknowledgement of the state change to the fork logic 524, which in turn provides the acknowledgement to the first asynchronous finite state machine 502.

In the above description, embodiments are described with communications, requests, and acknowledgements sent between components. These communications, requests, and acknowledgements are sent over physical or conductive connections or other transmission mediums between the components. Further, the fork logic, join logic, and other logic components are physically implemented using logic gate circuits as described with respect to FIG. 7. Moreover, the clock signal generated by handshake controller is a trigger signal based on the programmed logic of the handshake controller rather than a synchronous clock signal that is generated by, for example, a crystal oscillator.

Thus, some embodiments described herein provide, among other things, sequential asynchronous systems and methods including asynchronous state machines. Various features and advantages of the invention are set forth in the following claims.

What is claimed is:

1. A sequential asynchronous system comprising:
   a first asynchronous finite state machine operating at a first clock rate;
   a second asynchronous finite state machine operating at a second clock rate different than the first clock rate;
   a fork and join logic circuit coupled to the first asynchronous finite state machine and the second asynchronous finite state machine, and including fork logic and join logic,
      the fork logic configured to generate a fork request based on a first state of the first asynchronous finite state machine, and
      the join logic configured to
         receive the fork request from the fork logic,
         receive a communication request from the second asynchronous finite state machine based on a second state of the second asynchronous finite state machine,
         initiate a state transition of the second asynchronous finite state machine in response to receipt of the fork request and the communication request, and
         provide a join acknowledgement to the fork logic upon completion of the state transition, wherein the fork logic sends the join acknowledgement to the first asynchronous finite state machine.

2. The sequential asynchronous system of claim 1, wherein the first asynchronous finite state machine further comprises:
   a first handshake controller and a second handshake controller, one of the first handshake controller and the second handshake controller configured to generate a first clock signal at the first clock rate.

3. The sequential asynchronous system of claim 2, further comprising:
   a first state register that receives the first clock signal and is configured to store a current state of the first asynchronous finite state machine; and
   a first combinational logic that receives the current state from the first state register and is configured to output a next state of the first asynchronous finite state machine to the first state register, wherein the first state register replaces the current state with the next state.

4. The sequential asynchronous system of claim 3, further comprising a first delay path and a second delay path between the first handshake controller and the second handshake controller, wherein the first asynchronous finite state machine is configured to select one from the group consisting of the first delay path and the second delay path based on the current state of the first asynchronous finite state machine.

5. The sequential asynchronous system of claim 3, wherein the first handshake controller is configured to:
   provide a first request;
   receive a first acknowledgement from the second handshake controller;
   receive a second request from the second handshake controller; and
   provide a second acknowledgement to the second handshake controller.

6. The sequential asynchronous system of claim 5, further comprising:

a selection circuit receiving the first request from the first handshake controller, the selection circuit configured to:
   provide the first request to the fork logic when the first asynchronous finite state machine is in the first state; and
   provide the first request to the second handshake controller when the first asynchronous finite state machine is in a third state.

7. The sequential asynchronous system of claim 1, wherein the second asynchronous finite state machine further comprises:
   a third handshake controller and a fourth handshake controller, one of the third handshake controller and the fourth handshake controller configured to generate a second clock signal at the second clock rate.

8. The sequential asynchronous system of claim 7, further comprising:
   a second state register that receives the second clock signal and configured to store a current state of the second asynchronous finite state machine; and
   a second combinational logic that receives the current state from the second state register and configured to output a next state of the second asynchronous finite state machine to the second state register, wherein the second state register replaces the current state with the next state.

9. The sequential asynchronous system of claim 8, further comprising a first delay path and a second delay path between the third handshake controller and the fourth handshake controller, wherein the second asynchronous finite state machine is configured to select one from the group consisting of the first delay path and the second delay path based on the current state of the second asynchronous finite state machine.

10. The sequential asynchronous system of claim 8, wherein the third handshake controller is configured to:
   provide a third request,
   receive a third acknowledgement from the join logic,
   receive a fourth request from the fourth handshake controller, and
   provide a fourth acknowledgement to the fourth handshake controller.

11. The sequential asynchronous system of claim 10, further comprising:
   a selection circuit receiving the third request from the third handshake controller, the selection circuit configured to:
      provide the third request to the join logic when the second asynchronous finite state machine is in the second state; and
      provide the third request to the fourth handshake controller when the second asynchronous finite state machine is in a fourth state.

12. The sequential asynchronous system of claim 11, wherein the join logic is further configured to:
   provide a signal to the fourth handshake controller upon receiving the fork request and the communication request;
   receive the third acknowledgement from the fourth handshake controller; and
   provide the third acknowledgement to the third handshake controller.

13. A method for a sequential asynchronous system, the method comprising:
   operating a first asynchronous finite state machine at a first clock rate;
   operating a second asynchronous finite state machine at a second clock rate different than the first clock rate;
   generating, with fork logic included in a fork and join logic circuit coupled to the first asynchronous finite state machine and the second asynchronous finite state machine, a fork request based on a first state of the first asynchronous finite state machine;
   receiving, with join logic included in the fork and join logic circuit, the fork request from the fork logic;
   receiving, with the join logic, a communication request from the second asynchronous finite state machine based on a second state of the second asynchronous finite state machine;
   initiating, with the join logic, a state transition of the second asynchronous finite state machine in response to receipt of the fork request and the communication request; and
   providing, with the join logic, a join acknowledgement to the fork logic upon completion of the state transition, wherein the fork logic sends the join acknowledgement to the first asynchronous finite state machine.

14. The method of claim 13, further comprising:
   providing, with a first handshake controller of the first asynchronous finite state machine, a first request;
   receiving, with the first handshake controller, a first acknowledgement from a second handshake controller of the first asynchronous finite state machine;
   receiving, with the first handshake controller, a second request from the second handshake controller; and
   providing, with the first handshake controller, a second acknowledgement to the second handshake controller.

15. The method of claim 14, further comprising:
   receiving, with a selection circuit connected to the first handshake controller, the first request from the first handshake controller
   providing, with the selection circuit, the first request to the fork logic when the first asynchronous finite state machine is in the first state; and
   providing, with the selection circuit, the first request to the second handshake controller when the first asynchronous finite state machine is in a third state.

16. The method of claim 13, further comprising:
   providing, with a third handshake controller of the second asynchronous finite state machine, a third request;
   receiving, with the third handshake controller, a third acknowledgement from the join logic;
   receiving, with the third handshake controller, a fourth request from a fourth handshake controller; and
   providing, with the third handshake controller, a fourth acknowledgement to the fourth handshake controller.

17. The method of claim 16, further comprising:
   receiving, with a selection circuit connected to the third handshake controller, a first request from the third handshake controller;
   providing, with the selection circuit, the first request to the join logic when the second asynchronous finite state machine is in the second state; and
   providing, with the selection circuit, the first request to the fourth handshake controller when the first asynchronous finite state machine is in a fourth state.

18. The method of claim 17, further comprising:
   providing, with the join logic, a signal to the fourth handshake controller upon receiving the fork request and the communication request;
   receiving, with the join logic, the third acknowledgement from the fourth handshake controller; and providing, with the join logic, the third acknowledgement to the third handshake controller.

* * * * *